US006231086B1

(12) United States Patent
Tierling

(10) Patent No.: US 6,231,086 B1
(45) Date of Patent: May 15, 2001

(54) PIPE-IN-PIPE MECHANICAL BONDED JOINT ASSEMBLY

(75) Inventor: Kenneth Tierling, Conroe, TX (US)

(73) Assignee: Unisert Multiwall Systems, Inc., Conroe, TX (US)

( * ) Notice: Subject to any disclaimer, the term of this patent is extended or adjusted under 35 U.S.C. 154(b) by 0 days.

(21) Appl. No.: 09/535,627

(22) Filed: Mar. 24, 2000

(51) Int. Cl.[7] .............................. F16L 13/14; F16L 25/00
(52) U.S. Cl. .................. 285/123.15; 285/47; 285/123.1; 285/288.1; 285/915
(58) Field of Search ................... 285/47, 123.1, 285/123.15, 288.1, 383, 382, FOR 113, FOR 120, 915, 921

(56) References Cited

U.S. PATENT DOCUMENTS

| 1,140,633 | * | 5/1915 | Trucano | 285/123.15 |
|---|---|---|---|---|
| 2,967,067 | * | 1/1961 | Singer | 285/382 |
| 3,662,045 | | 5/1972 | Tierling | 264/35 |
| 3,794,358 | * | 2/1974 | Allen et al. | 285/47 |
| 3,885,595 | * | 5/1975 | Gibson | 285/47 |
| 4,298,221 | * | 11/1981 | McGugan | 285/382 |
| 4,328,983 | * | 5/1982 | Gibson | 285/382 |
| 4,363,504 | * | 12/1982 | De Feo et al. | 285/47 |
| 4,400,019 | | 8/1983 | Fruck | 285/55 |
| 4,415,184 | * | 11/1983 | Stephenson et al. | 285/47 |
| 4,527,820 | * | 7/1985 | GIbson | 285/382.2 |
| 4,687,233 | | 8/1987 | Edwards | 285/55 |
| 5,048,871 | | 9/1991 | Pfeiffer et al. | 285/39 |
| 5,143,381 | | 9/1992 | Temple | 277/1 |
| 5,309,620 | * | 5/1994 | Shinohara et al. | 29/432 |
| 5,988,691 | | 11/1999 | Cruickshank | 285/55 |

FOREIGN PATENT DOCUMENTS

3842647 * 6/1990 (DE) ...................................... 285/47

* cited by examiner

*Primary Examiner*—Eric K. Nicholson
(74) *Attorney, Agent, or Firm*—Mary J. Gaskin

(57) ABSTRACT

The invention is directed to a double-wall steel pipe joint. Each section of double-wall steel pipe has a steel outer casing and a steel inner carrier pipe. The completed joint comprises a steel joint ring fitted within the annular space at the end of each double-wall steel pipe section. The combination of locking serration and epoxy bonding join and seal the inner steel pipe to the bore of the joint ring, without welding. Welding joins the ends of the sections of outer casing.

32 Claims, 5 Drawing Sheets

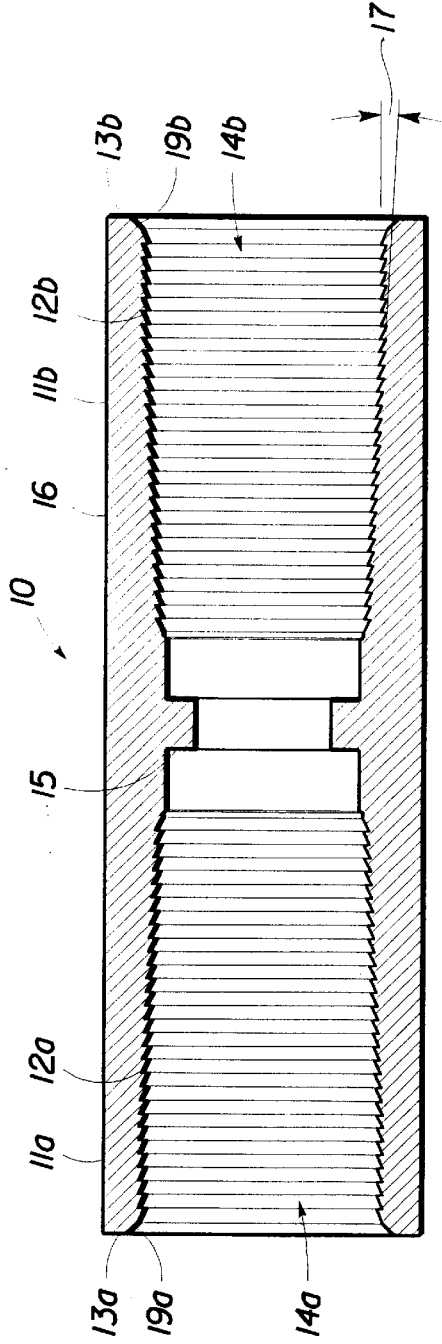
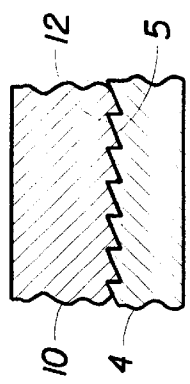
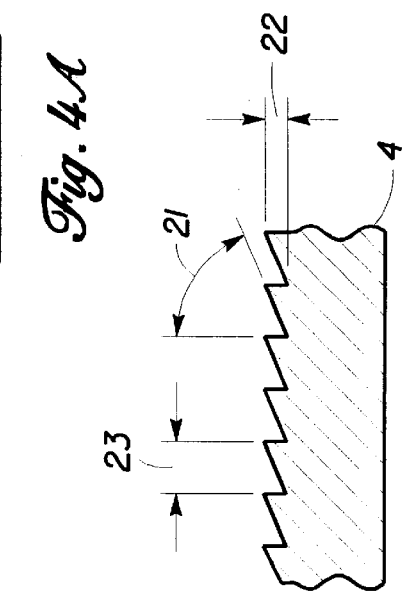
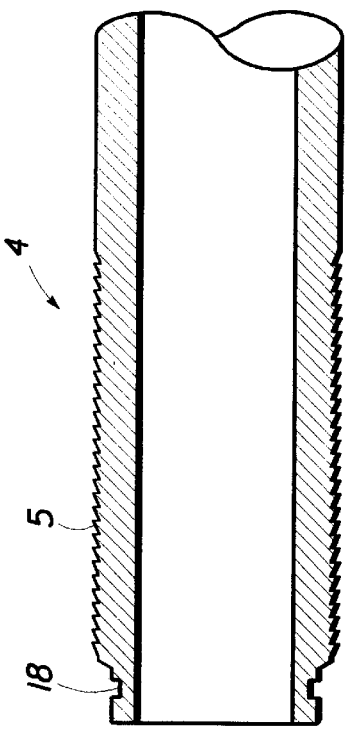

PIPE-IN-PIPE MECHANICAL BONDED JOINT ASSEMBLY

BACKGROUND OF THE INVENTION

The present invention is directed to methods and apparatus for joining sections of double-wall steel pipe. Double-wall steel pipes are typically used in specialty pipeline systems to provide an additional measure of protection for containment of the material being transported. For instance, double-wall steel pipelines are typically installed in subsea operations and are often used for the transportation of corrosive or hazardous material. The annulus between the two "walls" may be filled with an insulation material to provide thermal protection for temperature-sensitive materials, such as crude oil or heavy fuel oil, where external pipe insulation methods are not suitable. In some applications, the combination of both leak containment and thermal protection are desirable.

A double-wall steel pipe typically comprises a steel outer casing and a steel inner carrier pipe. The outer casing provides bending, and tensile strength to the pipe, in addition to providing containment of the material being transported. The inner carrier pipe provides bending and tensile strength, as well as radial strength.

Historically, sections of double-wall steel pipes have been joined by welding both the inner carrier pipe and the outer casing. The inner carrier pipe must extend beyond the outer casing on both ends of adjacent double-wall sections in order to provide access for full circumference welding and weld inspection. Welding is done either by a machine affixed to the inner carrier pipe or by hand. After the sections of inner carrier pipe are welded, a two-piece steel joint is used to join the steel outer casing. This two-piece casing joint is comprised of two half-rings of sufficient length to join adjacent sections of outer casing. The half-rings are fabricated from a section of steel pipe with the same outside diameter, wall thickness and steel grade as the steel outer casing. The steel pipe section is cut to fit the open area remaining between adjacent outer casing sections. The two half-rings are formed by cutting the steel pipe section axially 180° apart. One half-ring forms the bottom portion of the casing joint, the second half-ring the top portion. Two axial welds join the half-rings to form the outer casing joint. Two full circumference welds join adjacent sections of steel outer casing to the steel casing joint. This method of joining two sections of double-wall steel pipe is both time-consuming and labor-intensive.

The present invention eliminates the step of welding in order to join the inner steel pipe. In addition, the present invention succeeds in joining the steel outer casing of adjacent double-wall pipe sections with one weld instead of four. Reducing the number of welds required saves time and increases production.

The disadvantages of the prior art are overcome with the present invention, and novel methods and apparatus are hereinafter described for efficiently and reliably joining together sections of double-wall steel pipelines.

SUMMARY OF THE INVENTION

In an exemplary embodiment of the present invention, convenient lengths of double-wall steel pipe may be formed in a manufacturing plant, comprising a steel outer pipe or casing, a steel inner pipe or carrier, and an optional annular foam or other insulating material. If foam or another insulating material is used, both the casing and the carrier will extend a short distance beyond the annular insulating material, leaving an annular void at both ends of each pipe section. The double-wall steel pipe joint is formed in the general shape of a ring fabricated according to the diameter of the double-wall steel pipe. The joint ring is a steel band having a serrated inner circumference, or bore, which is slightly tapered at both ends. The outer circumference of the ends of the steel inner pipe is also serrated. Serration geometry provides resistance to axial tension and pullout during installation and during subsequent heating and cooling cycles. A groove may be cut in the end of each section of inner pipe to hold a hydraulic O-ring.

In the field, the double-wall steel pipe may be joined by installing the pipe joint of the present invention according to the following procedures. Prior to joining, the joint ring may be heated, causing it to expand. Epoxy is applied to the ends of the steel inner pipe, which have circumferential serrations on their outer circumferences. Epoxy is also applied to the serrated bore of the joint ring. The joint ring is then slipped into the annular space as the two pipe sections it connects are pulled together. As the joint ring cools, it contracts, locking onto the ends of the sections of inner pipe it joins. To ensure performance, taper in the bore of the steel joint ring must not be great enough to cause the steel inner pipe to yield. Inner pipe deformation should be in the elastic range. The elevated temperature of the joint ring increases the cure rate of the epoxy, reducing the time required for the epoxy to achieve its requisite strength. The sliding engagement and the contraction of the joint ring onto the serrated inner pipe ends, along with the epoxy film therebetween, seal the joint's bore to the inner pipe, without welding.

Low operating pressure systems and/or small pipe diameter systems may be joined without preheating the joint ring. These systems will typically require less insertion force for full depth insertion of the inner pipe into the joint ring. Additionally, less than optimum epoxy strength may be sufficient for form a fully-sealed joint for low operating pressure system requirements. For example, an epoxy may develop a lap shear of 2,500 psi at low temperatures and 3,000 psi or more when cured above 150° F. If the force required for insertion is not excessive and if the epoxy lap shear strength required is obtainable at lower temperatures, preheating will not be required.

After the ends of the inner pipe are joined, adjacent ends of the sections of steel outer casing are welded together, completing the joining operation. As the outer casing is welded, the joint ring acts as a heat sink. The heat absorbed by the joint ring keeps the epoxy, which is located where the joint ring contacts the surface of the inner pipe, in the desired temperature range for both minimum cure time and maximum strength development.

The joint ring is fabricated to have higher radial and tangential strength than the steel inner pipe, allowing the joint ring to form a tight seal when inner pipe is under high pressure. Sealing surfaces are axially aligned. Therefore, high pressure forces the inner pipe wall to press against the joint, sealing the joint tightly.

Double-wall steel pipe assemblies are suitable for many pipeline applications in which the use of single-wall pipe is not acceptable due to environmental, safety, thermal, negative buoyancy, and other considerations. In addition to its reliability with respect to sealing the fluids carried by the steel inner pipe, the pipe joint described herein offers cost effectiveness due to the efficiency of its installation. Therefore, its use in the installation of double-wall steel pipelines is preferable to the use of pipe joints which require welding to join both the inner pipe and the outer casing of sections of double-wall steel pipe.

The present invention may also be applied as a bell and spigot. Welding one side of a joint ring onto an end of a steel inner pipe forms the bell. The other end of the steel inner pipe, fabricated with full circumferential serrations, is the spigot. The procedure used to join the sections is similar to that described above. However, in the field, the joint ring requires no handling, and epoxy application is reduced by half.

The present invention may also be applied joining single-wall steel pipe when welding is not possible due to an explosive atmosphere or the presence of a pipe coating and/or lining that cannot withstand the heat of welding.

Accordingly, it is an object of the present invention to provide a novel joint for joining sections of double-wall steel pipe.

Another object of the present invention is to provide a double-wall steel pipeline joint which reliably seals the pipeline fluids carried in an inner steel pipe, under high pipeline pressure.

Yet another object of the present invention is to provide a method and apparatus for joining sections of double-wall steel pipe in a time-efficient and cost-effective manner.

Still another object of the present invention is to provide a method and apparatus for joining the inner carrier pipe, or a single-wall steel pipe, when it is internally coated or lined with materials which cannot withstand the heat resulting from joining by weld.

These and other features and advantages will become apparent in the following detailed description, wherein reference is made to the figures in the accompanying drawings.

BRIEF DESCRIPTION OF THE DRAWINGS

FIG. 2 is a fractional longitudinal cross-sectional view of the pipe joint assembly of the present invention, showing the locking serrations on the bore of the joint ring.

FIG. 3 is a fractional longitudinal cross-sectional view of an end of a steel inner carrier pipe, showing the serrations on its exterior circumference.

FIGS. 4a and 4b are details of the complementary serrations and the epoxy bond line surface.

NOTE: Certain features of the preferred embodiment, i.e., size of serrations, the amount of taper, and the deformation of the inner pipe, have been exaggerated for purposes of illustration.

DESCRIPTION OF THE PREFERRED EMBODIMENT

Figure 1:
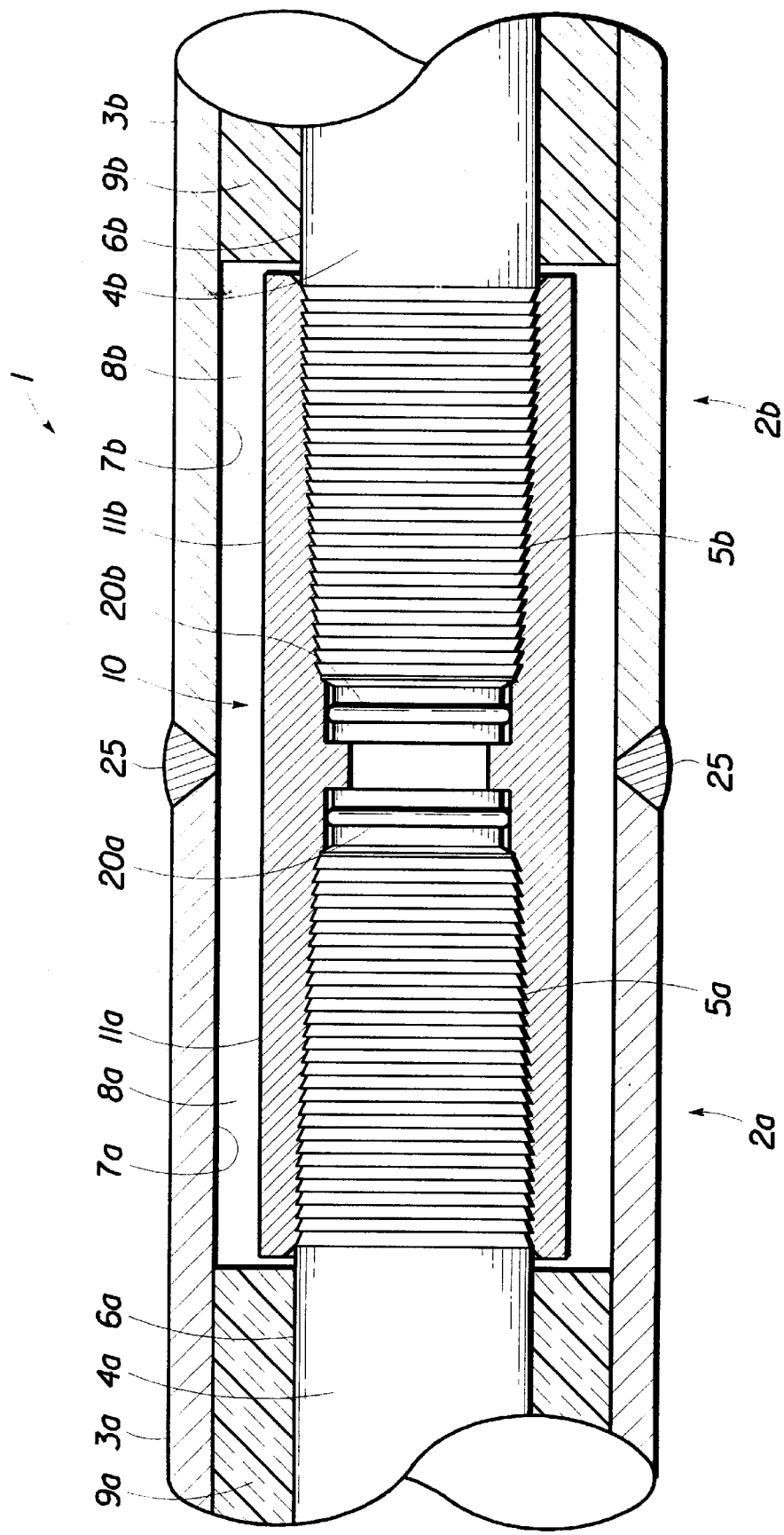
FIG. 1 is a simplified fractional longitudinal cross-sectional view through the pipe joint of the present invention, showing two sections of double-wall steel pipe which have been joined together, and further showing the serrations on the exterior surface of the inner pipe.

Referring to FIG. 1, the pipe joint assembly 1 connects a first section of double-wall steel pipe 2a to a second section of double-wall steel pipe 2b. Each section of double-wall pipe 2a, 2bhas a steel outer casing 3a, 3b and a steel inner pipe 4a, 4b (the carrier). The drawing shows the ridges of the circumferential serrations 5a, 5b on each of the adjoining ends of the inner pipe 4a, 4b. The outer diameter 6a, 6b of the steel inner pipe 4a, 4b may be 1" n to 2" (or less) smaller than the inner diameter 7a, 7b of the steel outer casing 3a, 3b, leaving an annulus 8a, 8b between the "walls" of the double-wall steel pipe 2a, 2b. With the exception of the part of the annulus 8a, 8b occupied by the joint ring 10, the annulus 8a, 8b generally may be filled with a non-metallic material such as insulation foam or another insulating material 9a, 9b.

The joint ring 10 is a ring-shaped band having a diameter less than the inner diameter 7a, 7b of the outer casing 3a, 3b, such that a portion of its collar 11a, 11b fits within the annulus 8a, 8b of each section of the double-wall steel pipe 2a, 2b. Because the steel joint ring 10, by itself, is able to withstand the radial and tangential stress components of a pressurized pipe without bowing or distorting, it does not have to interface with the outer casing 3a, 3b. The joint ring 10 may be fabricated from carbon steel. If the double-wall pipe 2a, 2b will be used to transport corrosive materials, another alloy may be used for fabricating the joint ring 10. The present invention utilizes a joint ring 10 which can be fabricated from virtually any metal alloy. Exotic alloys such as Hastelloy®, Inconel®, Incoloy®, Monel®, Nickel and 300 Series Stainless Steel have exceptional resistance to corrosion. Specific applications will depend on the corrosive characteristics of the material being transported. Typically, the specific alloy selected for fabrication of the joint ring 10 will be the same alloy as the inner pipe 4a, 4b. In any event, the joint ring 10 must be fabricated from a metal that is compatible with the line pipe it will join. Otherwise, if the metal of the joint ring 10 is reactive with the line pipe metal, the resulting corrosion will weaken the joint pipe assembly 1.

Hydraulic O-rings 20a, 20b may be fitted into slots near the ends of inner pipe 4a, 4b to provide secondary seals which are not essential to the integrity of the pipe joint assembly 1. The O-rings are made from neoprene or a similar material.

The ends of outer casing 3a, 3b are joined by full circumference weld 25.

FIG. 2 shows the joint ring 10 prior to installation. The joint ring 10 has been fabricated with locking serrations 12a, 12b on the interior circumference of the joint ring 10. The joint ring ends 13a, 13b have been slightly beveled to the joint bore 14a, 14b to form bevels 19a, 19b. From each joint end 13a, 13b toward the joint center shoulder 15, the joint bore 14a, 14b is parallel to the outer circumference 16 of the joint ring 10 for approximately ¾ to 1½. Then the joint bore 14a, 14b is slightly tapered. For example, the diameter of the joint bore 14a, 14b may decrease 0.012 inches over a 5½ distance to form a taper 17.

In FIG. 3, the end of a single steel inner pipe 4 is shown. It has been fabricated with circumferential serrations 5 which are complementary to the locking serrations 12a, 12b shown on the joint ring 10 in FIG. 2. A slot 18 has been cut near the end of the inner pipe 4 for installation of an O-ring 20 (not shown). The position and the depth of the slot 18 are critical. The outside diameter of an O-ring 20 insertion in the slot 18 must be less than the inside diameter of the bottom of the circumferential serrations 5.

FIG. 4a shows a typical geometry of the complementary serrations of the present invention. In the pipe joint assembly 1, the locking serrations 12 of the joint ring 10 mesh with the circumferential serrations 5 of the inner pipe 4 to join sections of inner carrier pipe. To achieve an optimum seal, epoxy has been applied to the contact surfaces of the circumferential serrations 5 and the locking serrations 12. An example of the epoxy used is Magnobond 6398, supplied by Magnolia Plastics. Magnobonde® 6398 is a thixatropic epoxy paste formulated specifically to bond to steel. As shown in FIG. 4b, the geometry of the serrations is designed so that insertion of the inner pipe 4 into the joint ring 10 encounters little resistance; on the other hand, pullout of the inner pipe 4 encounters maximum resistance. For example, in the detail shown, the angle 21 may be 60°, with a height 22 of 0.027" and a pitch 23 of 0.0625".

Figure 5:
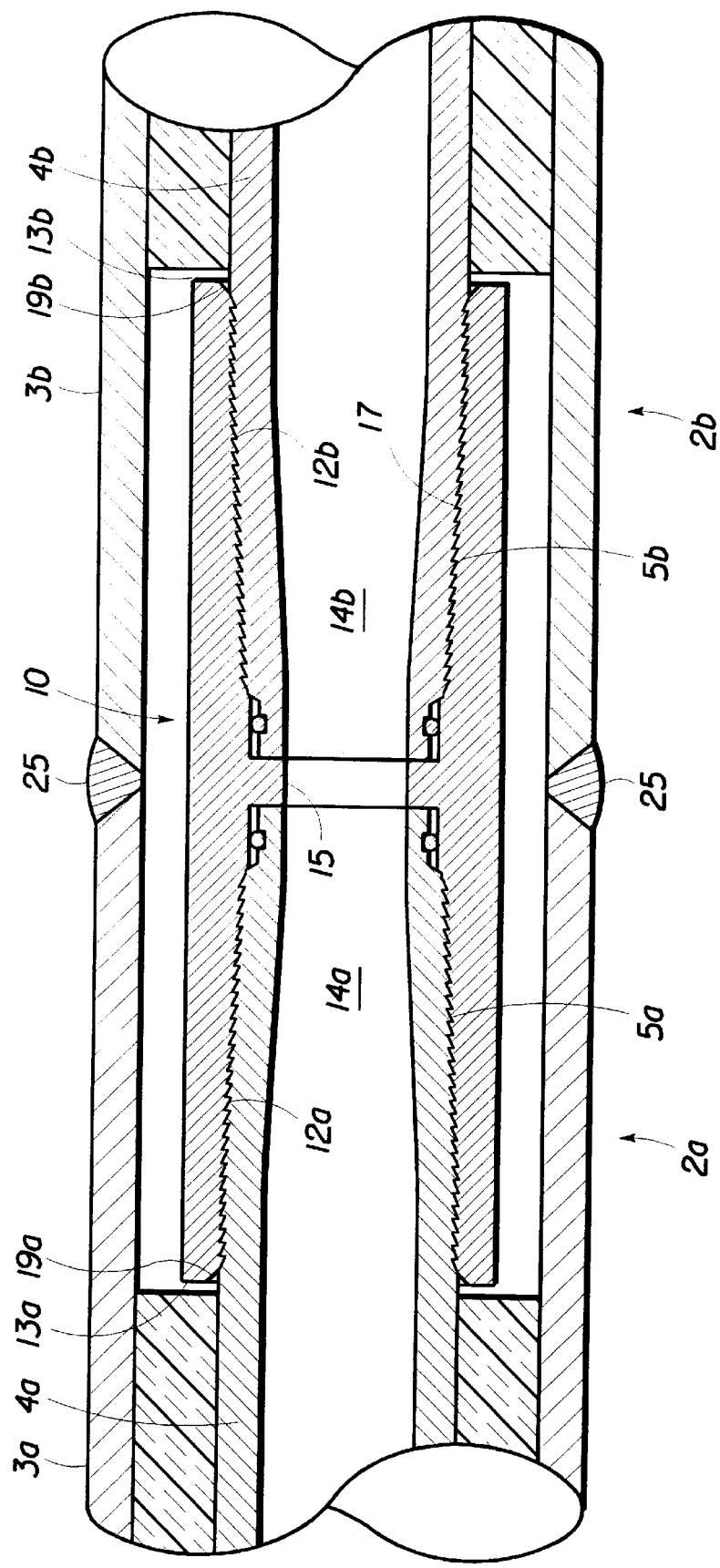
FIG. 5 is a detailed fractional longitudinal cross-sectional view of the pipe joint assembly of the present invention, showing two sections of double-wall steel pipe which have been joined together.

The complete procedure for joining sections of double-wall steel pipe may best be understood by referring to FIG. 5. First, the joint ring 10 is heated, whereby it expands. Epoxy is applied to the locking serrations 12a, 12b on the interior circumference of the joint ring, and to the circumferential serrations 5a, 5b on the ends of the steel inner pipe 4a, 4b. The slight bevel 19a, 19b on the joint ring ends 13a, 13b provides a guide the steel inner pipes 4a, 4b will follow as two sections of double-wall steel pipe 2a, 2b are axially aligned and slip-fit together. As the steel inner pipe 4a, 4b is advanced into the straight-bore portion of the joint ring 10, final axial alignment is achieved. As the inner pipe 4a, 4b advances further into the joint bore 14a, 14b, the inner pipe 4a, 4b contacts the tapered portion 17 of the joint ring 10, compressing the end of the inner pipe 4a, 4b. The joint ring 10 may be fabricated with a joint center shoulder 15 to ensure full depth insertion of the inner pipes 4a, 4b of the sections of double-wall steel pipe 2a, 2b. The two layers of epoxy form a seal and bond the steel inner pipe 4a, 4b to the joint ring 10.

After the beveled ends of the steel outer casing 3a, 3b have been fitted over the joint ring 10, full-circumference welding permanently joins the sections of double-wall steel pipe 2a, 2b at weld 25. The welding operation supplies additional heat to the joint ring 10, thereby maintaining or increasing its temperature. Keeping the joint ring 10 at the optimum curing temperature range for a longer period of time further ensures that the epoxy will fully cure to its maximum strength in the shortest possible time. As the joint ring 10 cools and contracts, it locks and seals the ends of the steel inner pipes 4a, 4b into place in the joint ring 10.

The above-described pipe assembly can be efficiently performed in the field. According to the present invention, convenient lengths of double-wall steel pipe (e.g. 40', 30' or 16040 lengths) may be completely formed at a manufacturing plant. The ends of the steel inner pipes will be serrated, and O-ring slots will be cut before the inner pipe is placed inside the outer casing. If insulating foam or other insulating material is used, it too will be installed in the manufacturing plant so that the outer casing and inner pipe extend beyond it, forming an annulus. Similarly, properly-sized joint rings may be prefabricated at a plant, with serrations on the joint bore.

Assembly of the sections of double-wall pipe is not dependent on extensive care or elaborate joint and pipe field operation techniques. The epoxy may be easily applied to the serrated areas at the installation site. The inner steel pipe may also be heated to maintain the optimum curing temperature of the epoxy. A temperature differential, with the inner steel pipe having the lower temperature, must be maintained. The temperature differential must be calculated to provide acceptable clearance between the joint ring and the steel inner pipe as the joint ring is slip-fit onto the inner pipe. The slip fitting of the joint over the end of the inner steel pipe is not difficult, since the steel joint acts as a guide to properly align the inner steel pipe within the joint; it also keeps the joined sections in place until the welding operation is complete. The only time-consuming operation is the welding of the outer casing of the sections of double-wall pipe.

Figure 6:
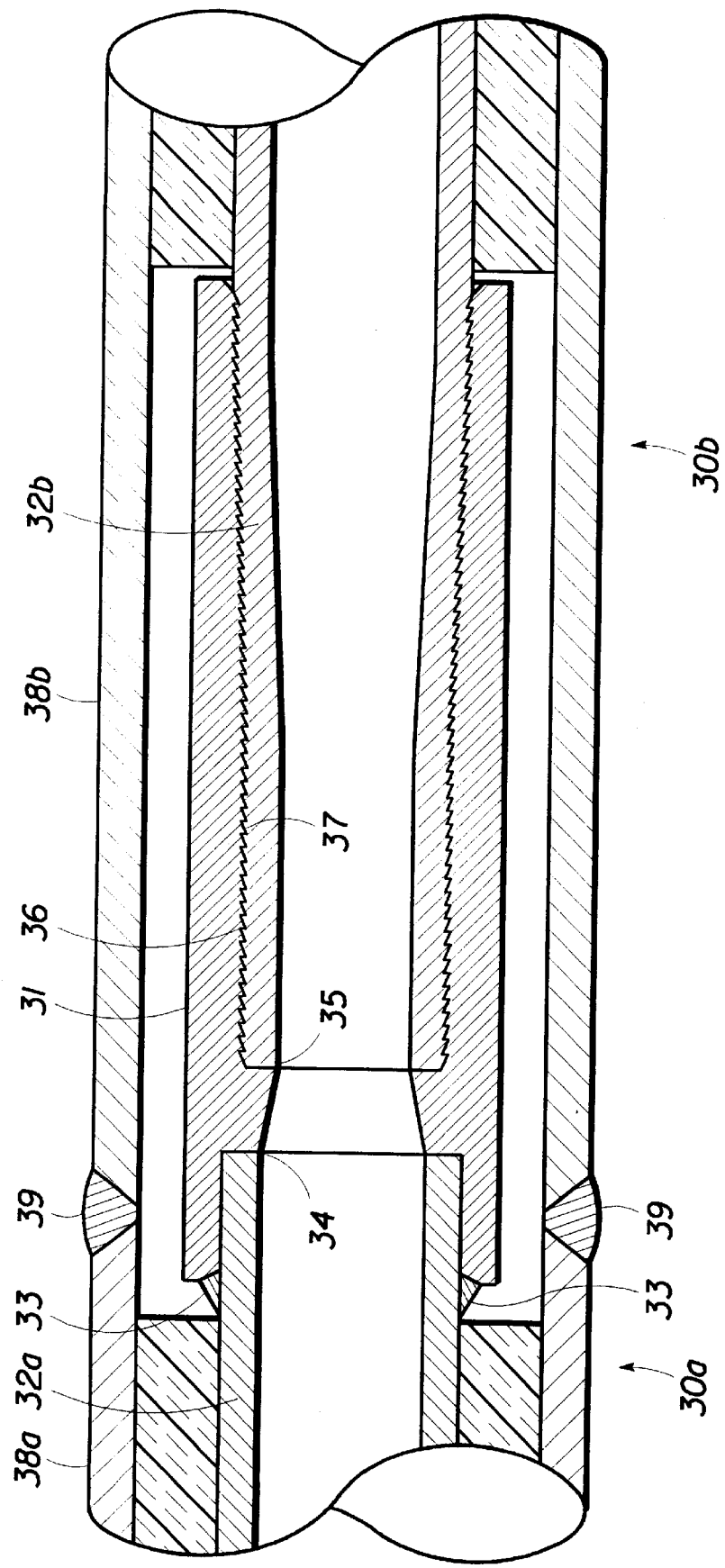
FIG. 6 is a fractional longitudinal cross-sectional view of another embodiment of the pipe joint assembly, showing a bell and spigot connection.

FIG. 6 shows the present invention as applied to a bell and spigot configuration. In this application, specially-fabricated sections of double-wall steel pipe 30a, 30b are used. On one end of each section, one side of a specially-fabricated joint ring 31 has been joined to an end of steel inner pipe 32a by weld 33 in a manufacturing facility, together forming the bell 34. The inner pipe 32b on the other end of each section, called the spigot 35, has circumferential serrations 36. The bell 34 has complementary locking serrations 37 on its inner circumference. in the field, joining the bell and spigot configuration will be similar to the process described above, for FIG. 5. However, this configuration requires the application of epoxy to and slip-fit joining of only one end of adjacent line pipe sections as opposed to two. Also, there will be no need for additional handling of the joint ring 31 in the field, as it will already be affixed to one end of a double-wall or single-wall line pipe section to form the bell 34. This configuration requires an application of epoxy to both the locking serrations 37 on the inner circumference of the bell 34 and to the circumferential serrations 36 on the outer circumference of the spigot 35. The bell 34 is heated, causing its inner circumference to increase for insertion of the spigot 35. When the bell 34 cools, it contracts, locking onto the spigot 35. The beveled edges of the outer casing 38a, 38b are then joined by weld 39.

It has been shown that epoxy of the type previously referenced, when cured at an elevated temperature, has a higher resistance to lap shear, greater compressive strength and reduced curing time. Therefore, heating the bell 34 also acts to affect development of these desirable properties of the epoxy.

Figure 7:
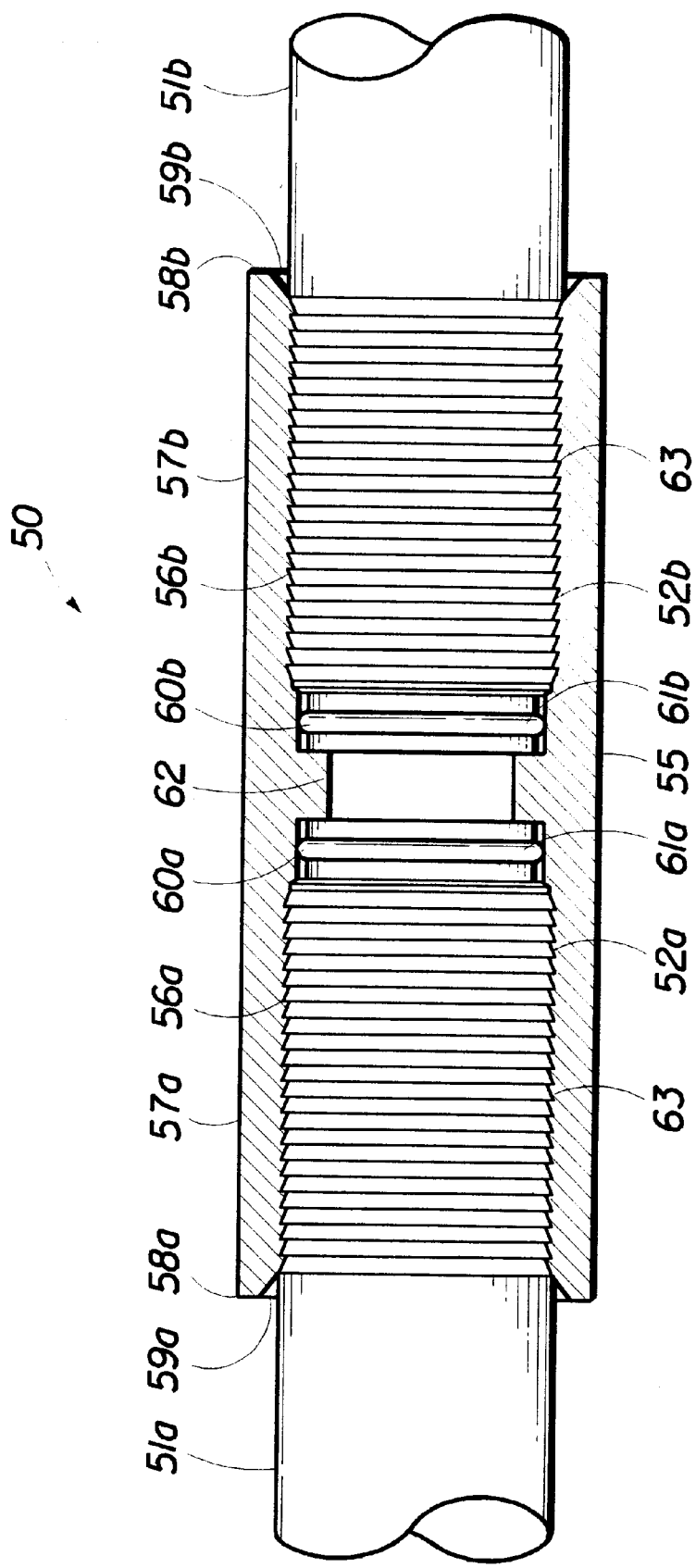
FIG. 7 is a fractional longitudinal cross-sectional view of yet another embodiment of the pipe joint assembly, showing its use to join single-wall steel pipe.

FIG. 7 shows the application of the present invention to join sections of single-wall steel pipe. Use of the present pipe assembly is desirable when welding is not possible due to an explosive atmosphere, or when weld joints, flange joints, or other pipe joints are not applicable or acceptable. The steel joint, by itself, is capable of withstanding the axial, radial, and tangential stress components of a pressurized pipeline. The pipe joint assembly 50 connects a first section of single-wall steel pipe 51a to a second section of single-wall steel pipe 51b. The drawing shows the ridges of circumferential serrations 52a, 52b on each of the adjoining ends of single-wall steel pipe 51a, 51b. The joint ring 55 is fabricated in the same configuration as the joint ring 10 described above for FIG. 2. The joint ring 55 has locking serrations 56b, 56b on the inner circumference of the collar 57a, 57b. The joint ring ends 58a, 58b have bevels 59a, 59b. O-rings 60a, 60b are optionally installed into slots 61a, 61b in the ends of single-wall steel pipe 51a, 51b. The ends of sections of single-wall steel pipe 51a, 51b have been inserted to rest against the joint center shoulder 62. As in FIG. 2, the inner circumference of the joint ring 55 has a tapered section 63.

I claim:

1. An assembly for joining lengths of double-wall pipe each length having a metal outer casing with a first end and a second end, a metal inner carrier with a first end and a second end, and an annulus formed between said outer casing and said inner carrier, comprising:

a first length of said pipe fabricated with closely-spaced exterior circumferential serrations on both ends of the inner carrier;

a second length of said pipe fabricated with closely-spaced exterior circumferential serrations on both ends of the inner carrier;

a metal ring-shaped member having a bore fabricated with closely-spaced serrations formed to be complementary to the serrations on both ends of the inner carrier when an end of the first length of pipe and an end of the second length of pipe are aligned adjacent to each other, said bore further having a first end tapered inwardly to the center of the ring-shaped member and a second end tapered inwardly to the center of the ring-shaped member;

epoxy bonding material for application to all surfaces of the exterior circumferential serrations on both adjacent ends of the inner carrier and the bore;

welding material for joining adjacent ends of said outer casing;

said assembly being completed by the mechanical and bonding engagement of two adjacent ends of the inner carrier in the bore of the ring-shaped member and the welding of adjacent ends of said outer casing.

2. The assembly of claim 1 further comprising a nonmetallic material generally filling said annulus.

3. The assembly of claim 1 further comprising an annular hydraulic O-ring disposed in a groove at the end of each inner pipe.

4. The assembly of claim 1 in which the ring-shaped member is pre-heated.

5. The assembly of claim 1 is which the metal is selected from the group consisting of carbon steel and alloys of steel.

6. A method for joining lengths of double-wall pipe each length having a metal outer casing with a first end and a second end, a metal inner carrier with a first end and a second end, and an annulus formed between the outer casing and the inner carrier comprising:

(a) fabricating a first and a second length of double-wall pipe with closely-spaced exterior circumferential serrations on both ends of the inner carrier;

(b) fabricating a metal ring-shaped member having a bore with closely-spaced serrations formed to be complementary to the serrations on both ends of the inner carrier after joining, said bore fabricated with a first end tapered inwardly to the center of the ring-shaped member and a second end tapered inwardly to the center of the ring-shaped member;

(c) applying a layer of epoxy bonding material to all surfaces of the circumferential serrations on both ends of the inner carrier and the bore;

(d) aligning an end of the first length of pipe in a spaced-apart relationship to an end of the second length of pipe;

(e) disposing the ring-shaped member in between the end of the first length of pipe and the end of the second length of pipe;

(f) inserting the second end of the inner carrier of the first length of pipe into the first end of the bore and inserting the first end of the inner carrier of the second length of pipe into the second end of the bore;

(g) advancing both ends of inner carrier into the bore until axial alignment is achieved;

(h) welding the ends of adjacent ends of outer casing.

7. The method of claim 6 further comprising fabricating each length of pipe with nonmetallic material generally filling the annulus.

8. The method of claim 6 further comprising fabricating each length of pipe with an annular hydraulic O-ring disposed in a groove at the end of each inner pipe.

9. The method of claim 6 in which the ring-shaped member is heated before the epoxy bonding material is applied.

10. The method of claim 6 in which the metal is selected from the group consisting of carbon steel and alloys of steel.

11. The method of claim 6 in which the amount of time consumed in welding operations is minimized.

12. An assembly for joining lengths of double-wall pipe each length having a metal outer casing with a first end and a second end, a metal inner carrier with a first end and a second end, and an annulus formed between said outer casing and said inner carrier, comprising:

a metal ring-shaped member having a bore with a first end and a second end, said bore fabricated with closely-spaced serrations formed to be complementary to the serrations on the first end of the inner carrier when an end of the first length of pipe and an end of the second length of pipe are aligned adjacent to each other, the second end of said bore tapered inwardly to the center of the ring-shaped member;

a first length of said pipe having the first end of ring-shaped member welded to the second end of the inner carrier;

a second length of said pipe fabricated with closely-spaced exterior circumferential serrations on the first end of the inner carrier;

epoxy bonding material for application to the surfaces of the circumferential serrations on both the first end of the inner carrier and the bore;

welding material for joining adjacent ends of said outer casing;

said assembly being completed by the mechanical and bonding engagement of the first end of the inner carrier in the bore of the ring-shaped member and the welding of adjacent ends of said outer casing.

13. The assembly of claim 12 further comprising a nonmetallic material generally filling said annulus.

14. The assembly of claim 12 further comprising an annular hydraulic O-ring disposed in a groove at the first end of the inner pipe.

15. The assembly of claim 12 in which the ring-shaped member is pre-heated.

16. The assembly of claim 12 is which the metal is selected from the group consisting of carbon steel and alloys of steel.

17. A method for joining lengths of double-wall pipe each length having a metal outer casing with a first end and a second end, a metal inner carrier with a first end and a second end, and an annulus formed between the outer casing and the inner carrier comprising:

(a) fabricating a metal ring-shaped member having a bore with a first end and a second end, said bore fabricated with closely-spaced serrations formed to be complementary to the serrations on the first end of the inner carrier after joining, said bore fabricated with the second end tapered inwardly to the center of the ring-shaped member; (b) welding the first end of the bore to the second end of the inner carrier of a first length of double-wall pipe;

(c) fabricating a second length of double-wall pipe with closely-spaced exterior circumferential serrations on the first end of the inner carrier;

(d) applying a layer of epoxy bonding material to all surfaces of the exterior circumferential serrations on the first end of the inner carrier and the bore;

(e) aligning an end of the first length of pipe in a spaced-apart relationship to an end of the second length of pipe;

(f) inserting the first end of the inner carrier of the second length of pipe into the second end of the bore;

(g) advancing the end of the inner carrier into the bore until axial alignment is achieved;

(h) welding the ends of adjacent ends of outer casing.

18. The method of claim 17 further comprising fabricating each length of pipe with nonmetallic material generally filling the annulus.

19. The method of claim 17 further comprising fabricating each length of pipe with an annular hydraulic O-ring disposed in a groove at an end of the inner pipe.

20. The method of claim 17 in which the ring-shaped member is heated before the epoxy bonding material is applied.

21. The method of claim 17 in which the metal is selected from the group consisting of carbon steel and alloys of steel.

22. The method of claim 17 in which the amount of time consumed in welding operations is minimized.

23. An assembly for joining lengths of metal single-wall pipe having a first end and a second end, comprising:

a first length of said pipe fabricated with closely-spaced exterior circumferential serrations on both ends;

a second length of said pipe fabricated with closely-spaced exterior circumferential serrations on both ends;

a metal ring-shaped member having a bore fabricated with closely-spaced serrations formed to be complementary to the serrations on both ends of the pipe when an end of the first length of pipe and an end of the second length of pipe are aligned adjacent to each other, said bore further having a first end tapered inwardly to the center of the ring-shaped member and a second end tapered inwardly to the center of the ring-shaped member;

epoxy bonding material for application to all surfaces of the exterior circumferential serrations on both adjacent ends of the pipe and the bore;

said assembly being completed by the mechanical and bonding engagement of two adjacent ends of the pipe in the bore of the ring-shaped member.

24. The assembly of 23 wherein the ring-shaped member has a thickness sufficient to withstand the maximum anticipated radial and tangential forces caused by pipeline fluid pressure.

25. The assembly of claim 23 further comprising an annular hydraulic O-ring disposed in a groove at each end of the pipe.

26. The assembly of claim 23 in which the ring-shaped member is pre-heated.

27. The assembly of claim 23 is which the metal is selected from the group consisting of carbon steel and alloys of steel.

28. A method for joining lengths of metal single-wall pipe having a first end and a second end comprising:

(a) fabricating a first length and a second length of pipe with closely-spaced exterior circumferential serrations on both ends;

(b) fabricating a metal ring-shaped member having a bore with closely-spaced serrations formed to be complementary to the serrations on both ends of the pipe after joining, said bore fabricated with a first end tapered inwardly to the center of the ring-shaped member and a second end tapered inwardly to the center of the ring-shaped member;

(c) applying a layer of epoxy bonding material to all surfaces of the exterior circumferential serrations on both adjacent ends of the pipe and the bore;

(d) aligning the second end of the first length of pipe in a spaced-apart relationship to the first end of the second length of pipe;

(e) disposing the ring-shaped member in between the second end of the first length of pipe and the first end of the second length of pipe;

(f) inserting the second end of the first length of pipe into the first end of the bore and inserting the first end of the second length of pipe into the second end of the bore;

(g) advancing both ends of the pipe into the bore until axial alignment is achieved;

(h) welding the ends of adjacent ends of outer casing.

29. The assembly of 28 wherein the ring-shaped member has a thickness sufficient to withstand the maximum anticipated radial and tangential forces caused by pipeline fluid pressure.

30. The method of claim 28 further comprising fabricating each length of pipe with an annular hydraulic O-ring disposed in a groove at the end of each inner pipe.

31. The method of claim 28 in which the ring-shaped member is heated before the epoxy bonding material is applied.

32. The method of claim 28 in which the metal is selected from the group consisting of carbon steel and alloys of steel.

* * * * *